(12) United States Patent
Sasaki

(10) Patent No.: US 6,729,012 B1
(45) Date of Patent: May 4, 2004

(54) METHOD OF MANUFACTURING A THIN-FILM MAGNETIC HEAD

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/549,617

(22) Filed: Apr. 14, 2000

(30) Foreign Application Priority Data

Apr. 28, 1999 (JP) .............................. 11-121110

(51) Int. Cl.⁷ ...................... G11B 5/17; G11B 5/127; G11B 5/39
(52) U.S. Cl. ................... 29/603.07; 29/603.23; 29/603.24; 29/603.14; 360/126; 360/119; 360/318
(58) Field of Search .................. 29/603.07, 603.23, 29/603.24, 603.14, 606; 360/318, 320, 126

(56) References Cited

U.S. PATENT DOCUMENTS

| | | |
|---|---|---|
| 5,438,747 A | 8/1995 | Krounbi et al. |
| 5,473,491 A | 12/1995 | Fujisawa et al. |
| 5,700,380 A | * 12/1997 | Krounbi et al. ...... 29/603.07 X |
| 5,703,740 A | 12/1997 | Cohen et al. |
| 5,883,760 A | 3/1999 | Yamada et al. |
| 6,236,538 B1 | 5/2001 | Yamada et al. |

FOREIGN PATENT DOCUMENTS

| | | |
|---|---|---|
| JP | A-48-55718 | 8/1973 |
| JP | A-60-10409 | 1/1985 |
| JP | A-60-113310 | 6/1985 |
| JP | A-62-245509 | 10/1987 |
| JP | A-63-201908 | 8/1988 |
| JP | A-6-195625 | 7/1994 |
| JP | A-6-314413 | 11/1994 |
| JP | A-7-262519 | 10/1995 |
| JP | 9-245321 | * 9/1997 |

* cited by examiner

Primary Examiner—A. Dexter Tugbang
(74) Attorney, Agent, or Firm—Oliff & Berridge, PLC

(57) ABSTRACT

A method of manufacturing a thin-film magnetic head comprises the steps of forming a bottom pole layer, forming a gap layer, forming a top pole layer, and forming a thin-film coil. The thin-film coil is wound around the top pole layer in a helical manner. In the step of forming the bottom pole layer, the bottom pole layer is formed to include a first layer facing a portion of the thin-film coil, and a second layer that forms a pole portion and is connected to a surface of the first layer facing the top pole layer. In the step of forming the thin-film coil, a portion of the coil is disposed on a side of the second layer and another portion of the coil is disposed over the top pole layer via an insulating film.

10 Claims, 11 Drawing Sheets

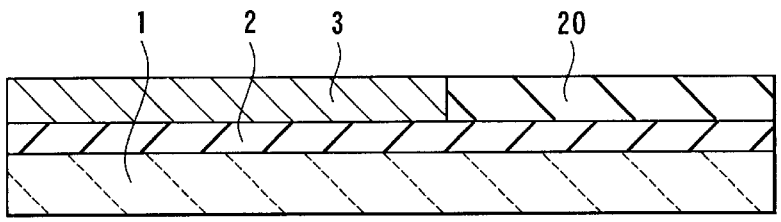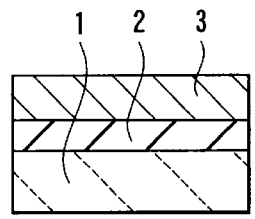
FIG. 1A　　　　　FIG. 1B
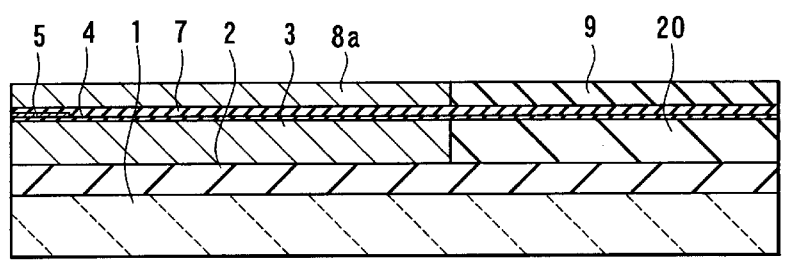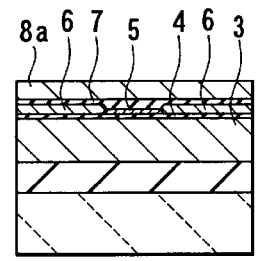
FIG. 2A　　　　　FIG. 2B
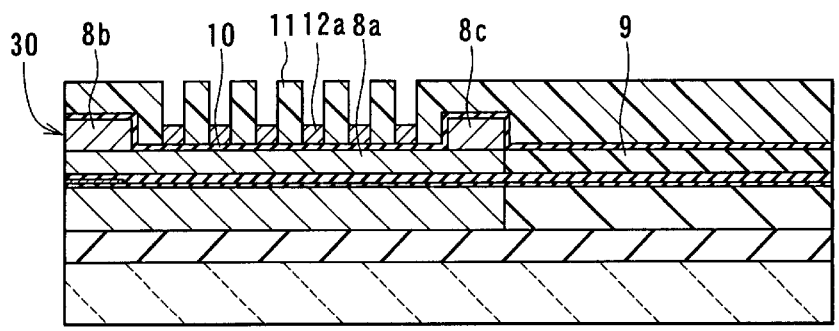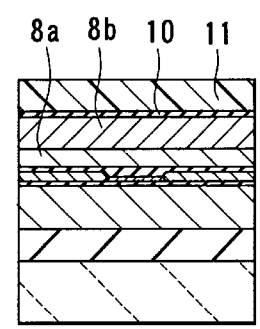
FIG. 3A　　　　　FIG. 3B

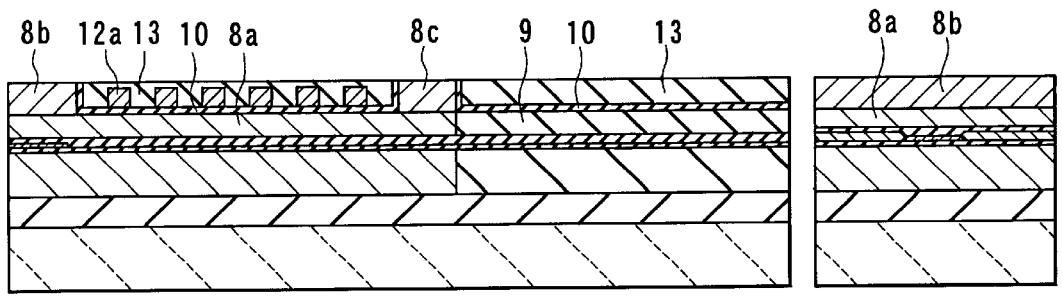
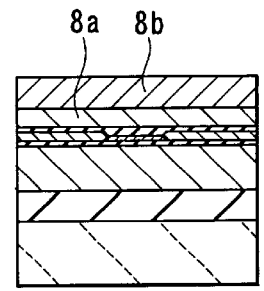
FIG. 4A              FIG. 4B
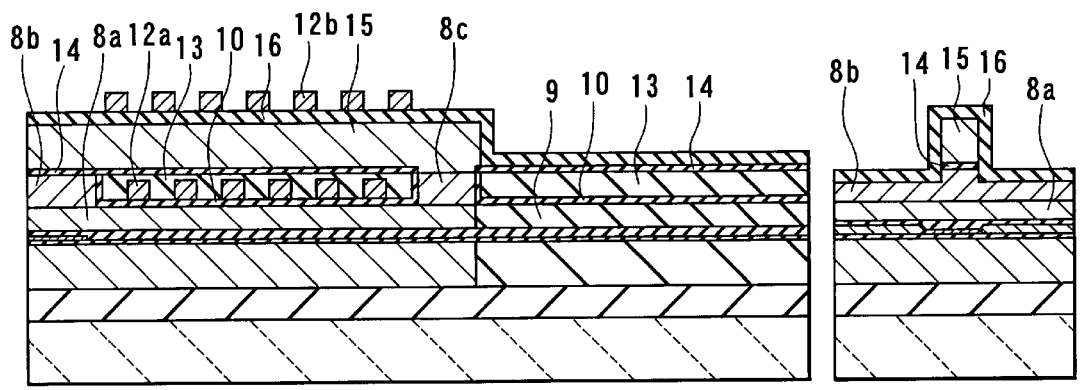
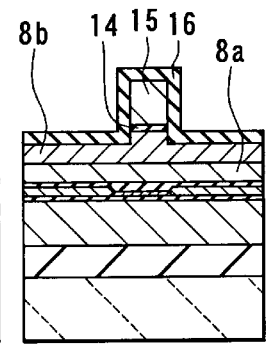
FIG. 5A              FIG. 5B

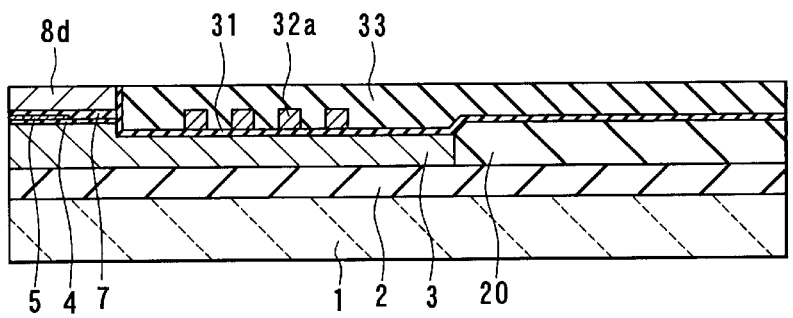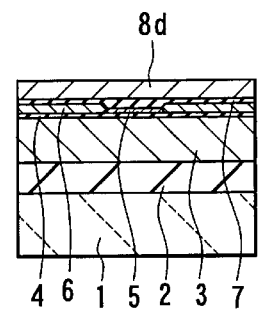
FIG. 11A  FIG. 11B
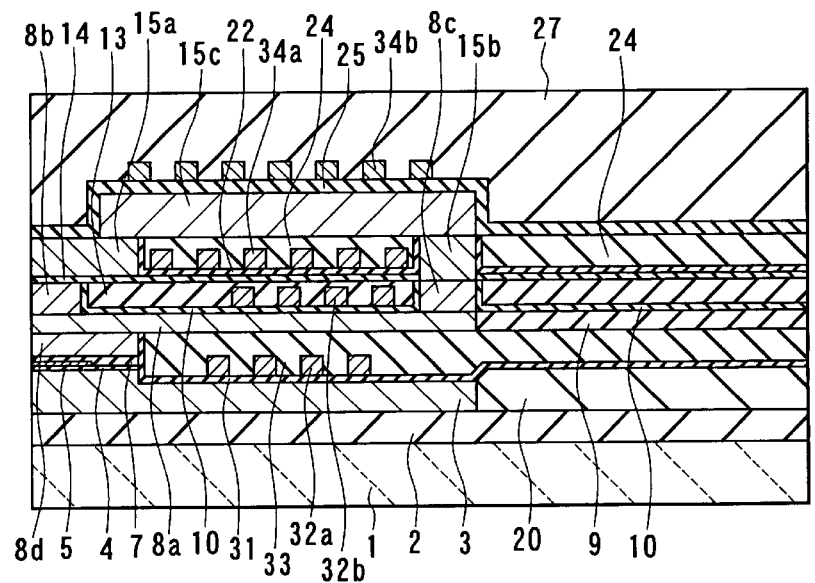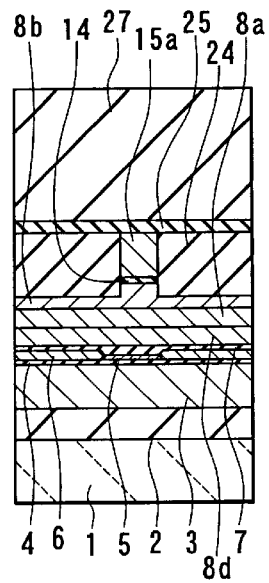
FIG. 12A  FIG. 12B

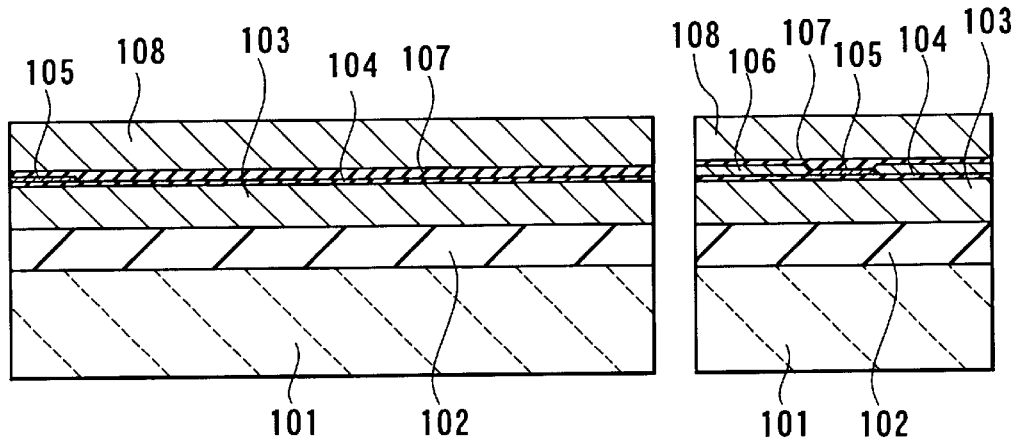
FIG. 14A
RELATED ART
FIG. 14B
RELATED ART
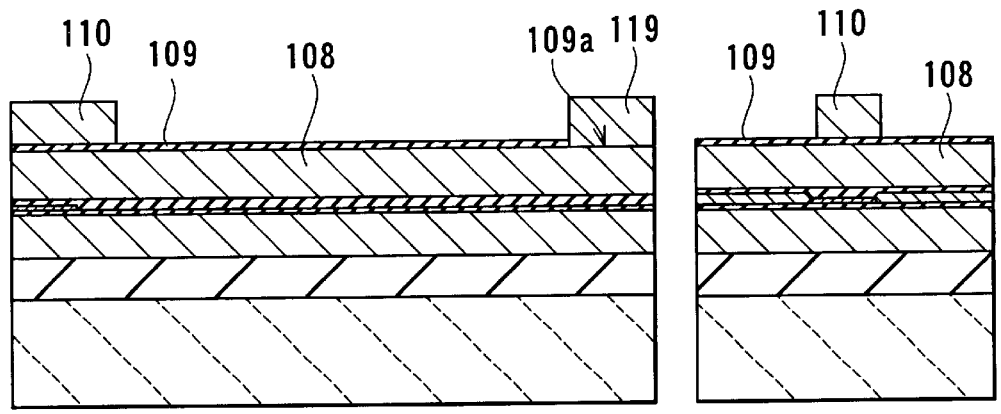
FIG. 15A
RELATED ART
FIG. 15B
RELATED ART

US 6,729,012 B1

METHOD OF MANUFACTURING A THIN-FILM MAGNETIC HEAD

BACKGROUND OF THE INVENTION

1. Field of the Invention

The present invention relates to a thin-film magnetic head comprising at least an induction-type magnetic transducer and a method of manufacturing such a thin-film magnetic head.

2. Description of the Related Art

Performance improvements in thin-film magnetic heads have been sought as surface recording density of hard disk drives has increased. Composite thin-film magnetic heads have been widely used. A composite head is made of a layered structure including a recording head having an induction-type magnetic transducer for writing and a reproducing head having a magnetoresistive (MR) element for reading.

It is required to increase the track density on a magnetic recording medium in order to increase recording density among the performance characteristics of a recording head. To achieve this, it is required to implement a recording head of a narrow track structure wherein the width of top and bottom poles sandwiching the recording gap layer on a side of the air bearing surface is reduced down to a micron or submicron order. Semiconductor process techniques are utilized to implement such a structure.

Reference is now made to FIG. 14A to FIG. 17A and FIG. 14B to FIG. 17B to describe an example of a method of manufacturing a composite thin-film magnetic head as an example of a related-art method of manufacturing a thin-film magnetic head. FIG. 14A to FIG. 17A are cross sections each orthogonal to the air bearing surface of the thin-film magnetic head. FIG. 14B to FIG. 17B are cross sections of a pole portion of the head each parallel to the air bearing surface.

In the manufacturing method, as shown in FIG. 14A and FIG. 14B, an insulating layer 102 made of alumina ($Al_2 O_3$), for example, having a thickness of about 5 to 10 $\mu$m is deposited on a substrate 101 made of aluminum oxide and titanium carbide ($Al_2 O_3$—TiC), for example. On the insulating layer 102 a bottom shield layer 103 made of a magnetic material is formed for making a reproducing head.

Next, on the bottom shield layer 103, alumina, for example, is deposited to a thickness of 100 to 200 nm through sputtering to form a bottom shield gap film 104 as an insulating layer. On the bottom shield gap film 104 an MR element 105 for reproduction having a thickness of tens of nanometers is formed. Next, a pair of electrode layers 106 are formed on the bottom shield gap film 104. The electrode layers 106 are electrically connected to the MR element 105.

Next, a top shield gap film 107 as an insulating layer is formed on the bottom shield gap film 104 and the MR element 105. The MR element 105 is embedded in the shield gap films 104 and 107.

Next, a top-shield-layer-cum-bottom-pole-layer (called a bottom pole layer in the following description) 108 having a thickness of about 3 $\mu$m is formed on the top shield gap film 107. The bottom pole layer 108 is made of a magnetic material and used for both a reproducing head and a recording head.

Next, as shown in FIG. 15A and FIG. 15B, on the bottom pole layer 108, a recording gap layer 109 made of an insulating film such as an alumina film whose thickness is 0.2 $\mu$m is formed. Next, a portion of the recording gap layer 109 is etched to form a contact hole 109a to make a magnetic path. On the recording gap layer 109 in the pole portion, a top pole tip 110 made of a magnetic material and having a thickness of 0.5 to 1.0 $\mu$m is formed for the recording head. At the same time, a magnetic layer 119 made of a magnetic material is formed for making the magnetic path in the contact hole 109a for making the magnetic path.

Next, as shown in FIG. 16A and FIG. 16B, the recording gap layer 109 and the bottom pole layer 108 are etched through ion milling, using the top pole tip 110 as a mask. As shown in FIG. 16B, the structure is called a trim structure wherein the sidewalls of the top pole (the top pole tip 110), the recording gap layer 109, and part of the bottom pole layer 108 are formed vertically in a self-aligned manner.

Next, an insulating layer 111 made of alumina, for example, and having a thickness of about 3 $\mu$m is formed on the entire surface. The insulating layer 111 is then polished to the surfaces of the top pole tip 110 and the magnetic layer 119 and flattened.

Next, on the flattened insulating layer 111, a thin-film coil 112 of a first layer is made of copper (Cu), for example, for the induction-type recording head. Next, a photoresist layer 113 is formed into a specific pattern on the insulating layer 111 and the coil 112. Heat treatment is then performed at a specific temperature to flatten the surface of the photoresist layer 113. On the photoresist layer 113, a thin-film coil 114 of a second layer is then formed. Next, a photoresist layer 115 is formed into a specific pattern on the photoresist layer 113 and the coil 114. Heat treatment is then performed at a specific temperature to flatten the surface of the photoresist layer 115.

Next, as shown in FIG. 17A and FIG. 17B, a top pole layer 116 is formed for the recording head on the top pole tip 110, the photoresist layers 113 and 115, and the magnetic layer 119. The top pole layer 116 is made of a magnetic material such as Permalloy. Next, an overcoat layer 117 of alumina, for example, is formed to cover the top pole layer 116. Finally, machine processing of the slider is performed to form the air bearing surface 118 of the thin-film magnetic head including the recording head and the reproducing head. The thin-film magnetic head is thus completed.

In FIG. 17A and FIG. 17B, 'TH' indicates the throat height and 'MR-H' indicates the MR height. The throat height is the length (height) of portions of two magnetic pole layers between the air-bearing-surface-side end and the other end, the portions facing each other with a recording gap layer in between. The MR height is the length (height) of the MR element between an end of the MR element closer to the air bearing surface and the other end. In FIG. 17A and FIG. 17B, 'P2W' indicates the pole width, that is, the recording track width. In addition to the factors such as the throat height and the MR height, the apex angle as indicated with θ in FIG. 17A and FIG. 17B is one of the factors that determine the performance of a thin-film magnetic head. The apex is a hill-like raised portion of the coils covered with the photoresist layers 113 and 115. The apex angle is the angle formed between the top surface of the insulating layer 111 and the straight line drawn through the edges of the pole-side lateral walls of the apex.

In order to improve the performance of the thin-film magnetic head, it is important to precisely form throat height TH, MR height MR-H, apex angle θ, and track width P2W as shown in FIG. 17A and FIG. 17B.

To achieve high surface recording density, that is, to fabricate a recording head with a narrow track structure, it has been particularly required that track width P2W fall within the submicron order of 1.0 µm or less. It is therefore required to process the top pole into the submicron order through semiconductor process techniques.

A problem is that it is difficult to form the top pole layer on the apex into small dimensions.

As disclosed in Published Unexamined Japanese Patent Application Hei 7-262519 (1995), for example, frame plating may be used as a method for fabricating the top pole layer. In this case, a thin electrode film made of Permalloy, for example, is formed by sputtering, for example, to fully cover the apex. Next, a photoresist is applied to the top of the electrode film and patterned through a photolithography process to form a frame to be used for plating. The top pole layer is then formed by plating through the use of the electrode film previously formed as a seed layer.

However, there is a difference in height between the apex and the other part, such as 7 to 10 µm or more. The photoresist whose thickness is 3 to 4 µm is applied to cover the apex. If the photoresist thickness is required to be at least 3 µm over the apex, a photoresist film having a thickness of 8 to 10 µm or more, for example, is formed below the apex since the fluid photoresist goes downward.

To implement a recording track width of the submicron order as described above, it is required to form a frame pattern of the submicron order through the use of a photoresist film. Therefore, it is required to form a fine pattern of the submicron order on the apex through the use of a photoresist film having a thickness of 8 to 10 µm or more. However, it is extremely difficult to form a photoresist pattern having such a thickness into a reduced pattern width, due to restrictions in a manufacturing process.

Furthermore, rays of light used for exposure of photolithography are reflected off the base electrode film as the seed layer. The photoresist is exposed to the reflected rays as well and the photoresist pattern may be out of shape. It is therefore impossible to obtain a sharp and precise photoresist pattern.

As thus described, it is difficult in prior art to fabricate the top pole layer with accuracy if the pole width of the submicron order is required.

To overcome the problems thus described, a method has been taken, as shown in the foregoing related-art manufacturing steps illustrated in FIG. 15A to FIG. 17A and FIG. 15B to FIG. 17B. In this method, a track width of 1.0 µm or less is formed through the use of the top pole tip 110 effective for making a narrow track of the recording head. The top pole layer 116 to be a yoke portion connected to the top pole tip 110 is then fabricated (as disclosed in Published Unexamined Japanese Patent Application Sho 62-245509 [1987] and Published Unexamined Japanese Patent Application Sho 60-10409 [1985]). That is, the ordinary top pole layer is divided into the top pole tip 110 and the top pole layer 116 to be the yoke portion in this method. As a result, the top pole tip 110 that defines the track width is formed into a submicron width on the flat top surface of the recording gap layer 109.

However, the following problems are still found in such a thin-film magnetic head.

(1) In the related-art thin-film magnetic head shown in FIG. 17A and FIG. 17B, the track width of the recording head is defined by the top pole tip 110. Therefore, it is not necessary that the top pole layer 116 is processed into dimensions as small as those of the top pole tip 110. However, if the track width of the recording head is extremely reduced, that is, 0.5 µm or less, in particular, processing accuracy for achieving the submicron order width is required for the top pole layer 116, too. However, the top pole layer 116 is formed on top of the apex in the related-art head. Therefore, it is difficult to reduce the top pole layer 116 in size, due to the reason described above. In addition, the top pole layer 116 is required to be greater than the top pole tip 110 in width since the top pole layer 116 is required to be magnetically connected to the top pole tip 110 smaller in width. Because of these reasons, the top pole layer 116 is greater than the top pole tip 110 in width in the related-art head. As a result, writing may be performed on a side of the top pole layer 116 and so-called 'side write' may result, that is, data is written in a region of a recording medium where data is not supposed to be written. Such a problem more frequently results when the coil is two-layer or three-layer to improve the performance of the recording head and the apex is thereby increased in height, compared to the case where the coil is one-layer.

(2) In the related-art magnetic head, the throat height is defined by the end of the top pole tip 110 opposite to the air bearing surface 118. However, if the top pole tip 110 is reduced in width, edges of the pattern are rounded in a photolithography process. As a result, the throat height that is required to be precisely controlled is made uneven, and the balance between the throat height and the track width of the MR element is disturbed in the steps of processing and lapping the air bearing surface 118. For example, if the track width of 0.5 to 0.6 µm is required, the following problem often arises. The end of the top pole tip 110 opposite to the air bearing surface 118 may be shifted from the zero throat height position (that is, the position of the air-bearing-surface-side end of the insulating layer that defines the throat height) toward the air bearing surface 118. The recording gap is thus made greater and writing of data is made impossible. Due to the problems (1) and (2) thus described, it is difficult to reduce the track width of the recording head of the prior-art thin-film magnetic head.

(3) Furthermore, in the prior-art magnetic head, it is difficult to reduce the magnetic path (yoke) length. That is, if the coil pitch is reduced, a head with a reduced yoke length is achieved and a recording head having an excellent high frequency characteristic is achieved, in particular. However, if the coil pitch is reduced to the limit, the distance between the zero throat height position and the outermost end of the coil is a major factor that prevents a reduction in yoke length. Since the yoke length of a two-layer coil can be shorter than that of a single-layer coil, a two-layer coil is adopted to many of recording heads for high frequency application. However, in the prior-art magnetic head, a photoresist film having a thickness of about 2 µm is formed to provide an insulating film between coil layers after a first layer is formed. Consequently, a small and rounded apex is formed at the outermost end of the first layer of the coil. A second layer of the coil is then formed on the apex. The second layer is required to be formed on a flat portion since it is impossible to etch the seed layer of the coil in the sloped portion of the apex, and the coil is thereby shorted.

Therefore, if the total coil thickness is 2 to 3 µm, the thickness of the insulating film between the layers of the coil is 2 µm, and the apex angle is 45 to 55 degrees, for example, the yoke length is required to be 8 to 10 µm which is twice as long as the distance between the outermost end of the coil and the neighborhood of the zero throat height position, that is, 4 to 5 µm (the distance between the innermost end of the coil and the portion where the top and bottom pole layers are connected to each other is required to be 4 to 5 µm, too), in addition to the length of the portion corresponding to the coil. This length of the portion except the portion corresponding to the coil is one of the factors that prevent a reduction in yoke length.

Assuming that a two-layer eleven-turn coil whose line width is 1.0 μm and the space is 1.0 μm is fabricated, for example, the portion of the yoke length corresponding to the coil 112 of the first layer is 11 μm, if the first layer is made up of six turns and the second layer is made up of 5 turns, as shown in FIG. 17A and FIG. 17B. In addition to this length, the total of 8 to 10 μm, that is, the distance between each of the outermost and innermost ends of the coil 112 of the first layer and each of ends of the photoresist layer 113 for insulating the coil 112, is required for the yoke length. In the present application, the yoke length is the length of a portion of the pole layer except the pole portion and the contact portions, as indicated with $L_0$ in FIG. 17A and FIG. 17B. As thus described, it is difficult in the prior art to further reduce the yoke length, which prevents improvements in high frequency characteristic.

The thin-film magnetic head shown in FIG. 17A and FIG. 17B has a flat-whorl-shaped coil. In contrast, a thin-film magnetic head having a helical-shaped coil wound around the pole layer is disclosed in U.S. Pat. No. 5,703,740, Published Unexamined Japanese Patent Application Sho 48-55718 (1973), Published Unexamined Japanese Patent Application Sho 60-113310 (1985) and Published Unexamined Japanese Patent Application Sho 63-201908 (1988), for example. Such a structure of the helical-shaped coil allows the magnetomotive force generated by the coil to be supplied to the pole layer with efficiency. As a result, it is possible that the number of turns of the coil is smaller than that of a flat-whorl-shaped coil. The yoke length is thereby reduced.

However, such a prior-art head with a helical-shaped coil has an apex, too. Therefore, the foregoing problems resulting from the apex remain unsolved.

OBJECT AND SUMMARY OF THE INVENTION

It is an object of the invention to provide a thin-film magnetic head and a method of manufacturing the same for reducing a track width and reducing a yoke length of an induction-type magnetic transducer.

A thin-film magnetic head of the invention comprises: a medium facing surface that faces toward a recording medium; a first magnetic layer and a second magnetic layer magnetically coupled to each other and including magnetic pole portions opposed to each other and placed in regions on a side of the medium facing surface, each of the magnetic layers including at least one layer; a gap layer provided between the pole portions of the first and second magnetic layers; and a thin-film coil wound around at least one of the magnetic layers in a helical manner and insulated from the first and second magnetic layers, a portion of the coil passing between the first and second magnetic layers. The first magnetic layer includes: a first portion facing the portion of the coil; and a second portion forming one of the pole portions and connected to a surface of the first portion facing the second magnetic layer. The portion of the coil is located on a side of the second portion of the first magnetic layer.

A method of the invention is provided for manufacturing a thin-film magnetic head comprising: a medium facing surface that faces toward a recording medium; a first magnetic layer and a second magnetic layer magnetically coupled to each other and including magnetic pole portions opposed to each other and placed in regions on a side of the medium facing surface, each of the magnetic layers including at least one layer; a gap layer provided between the pole portions of the first and second magnetic layers; and a thin-film coil insulated from the first and second magnetic layers, a portion of the coil passing between the first and second magnetic layers. The method includes the steps of: forming the first magnetic layer; forming the gap layer on the first magnetic layer; forming the second magnetic layer on the gap layer; and forming the coil such that the coil is wound around at least one of the magnetic layers in a helical manner and insulated from the first and second magnetic layers, the portion of the coil passing between the first and second magnetic layers. In the step of forming the first magnetic layer, the first magnetic layer is formed to include: a first portion facing the portion of the coil; and a second portion forming one of the pole portions and connected to a surface of the first portion facing the second magnetic layer. The portion of the coil is located on a side of the second portion of the first magnetic layer in the step of forming the coil.

According to the thin-film magnetic head or the method of manufacturing the same of the invention, the portion of the thin-film coil passes between the first and second magnetic layers, and the coil is wound around at least one of the magnetic layers in a helical manner. As a result, the yoke length is reduced. According to the invention, the first magnetic layer includes: the first portion facing the portion of the thin-film coil; and the second portion forming the pole portion and connected to the surface of the first portion facing the second magnetic layer. The portion of the coil is placed on a side of the second portion of the first magnetic layer. As a result, the second magnetic layer is formed on the flat surface. The track width of the recording head is thereby reduced.

According to the thin-film magnetic head or the method of the invention, the thin-film coil may include a portion wound around the second magnetic layer in a helical manner.

According to the head or the method, the second magnetic layer may include: a magnetic pole portion layer forming one of the pole portions; and a yoke portion layer connected to the pole portion layer and forming a yoke portion. In this case, the thin-film coil may include: a first portion that passes by a side of the second portion of the first magnetic layer and is wound around the second magnetic layer in a helical manner; and a second portion that passes by a side of the pole portion layer of the second magnetic layer and is wound around the second magnetic layer in a helical manner. Alternatively, the thin-film coil may include: a first portion that passes by a side of the second portion of the first magnetic layer and is wound around the first magnetic layer in a helical manner; and a second portion that passes by a side of the pole portion layer of the second magnetic layer and is wound around the second magnetic layer in a helical manner. An end face of the yoke portion layer that faces toward the medium facing surface may be located at a distance from the medium facing surface.

According to the head or the method, the second portion of the first magnetic layer may define a throat height, and the second magnetic layer may define a recording track width.

According to the head or the method, the head may further comprise an insulating layer that covers the portion of the coil located on the side of the second portion of the first magnetic layer, a surface of the insulating layer that faces the gap layer being flattened.

According to the head or the method, the head may further comprise: a magnetoresistive element; and a first shield layer and a second shield layer for shielding the magnetoresistive element, portions of the first and second shield layers located in regions on a side of the medium facing surface being opposed to each other, the magnetoresistive element being placed between the portions of the shield layers. In this case, the first magnetic layer may function as the second shield layer, too.

Other and further objects, features and advantages of the invention will appear more fully from the following description.

BRIEF DESCRIPTION OF THE DRAWINGS

FIG. 1A and FIG. 1B are cross sections for illustrating a step in a method of manufacturing a thin-film magnetic head of a first embodiment of the invention.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 4A and FIG. 4B are cross sections for illustrating a step that follows FIG. 3A and FIG. 3B.

FIG. 5A and FIG. 5B are cross sections for illustrating a step that follows FIG. 4A and FIG. 4B.

FIG. 11A and FIG. 11B are cross sections for illustrating a step in a method of manufacturing of a thin-film magnetic head of a third embodiment of the invention.

FIG. 12A and FIG. 12B are cross sections of the thin-film magnetic head of the third embodiment.

FIG. 14A and FIG. 14B are cross sections for illustrating a step in a method of manufacturing a thin-film magnetic head of related art.

FIG. 15A and FIG. 15B are cross sections for illustrating a step that follows FIG. 14A and FIG. 14B.

DETAILED DESCRIPTION OF THE PREFERRED EMBODIMENTS

Figures 6A, 6B:
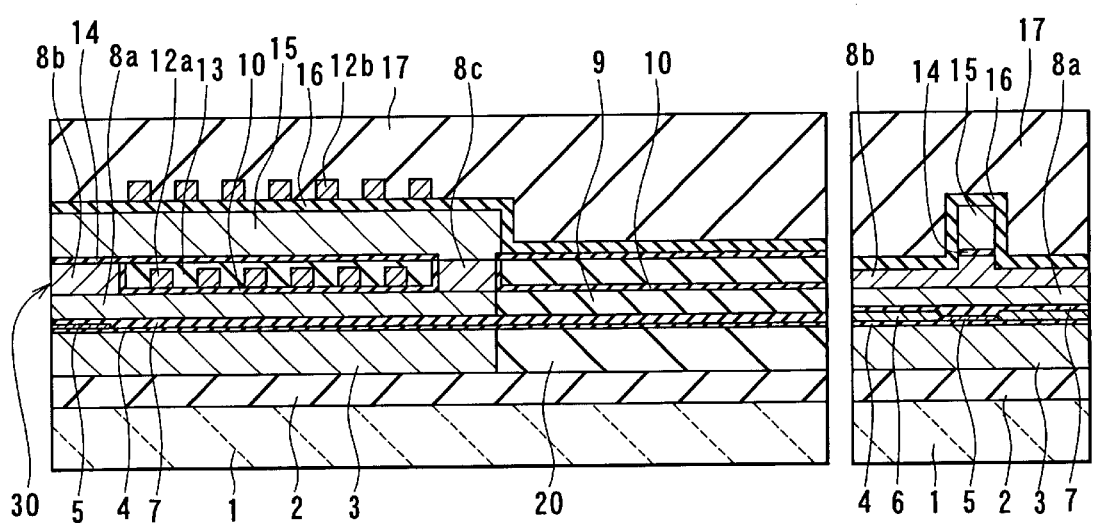
FIG. 6A and FIG. 6B are cross sections for illustrating a step that follows FIG. 5A and FIG. 5B.

Preferred embodiments of the invention will now be described in detail with reference to the accompanying drawings.

First Embodiment

Reference is now made to FIG. 1A to FIG. 6A, FIG. 1B to FIG. 6B, and FIG. 7 to describe a thin-film magnetic head and a method of manufacturing the same of a first embodiment of the invention. FIG. 1A to FIG. 6A are cross sections each orthogonal to an air bearing surface. FIG. 1B to FIG. 6B are cross sections of the pole portion each parallel to the air bearing surface.

In the manufacturing method, as shown in FIG. 1A and FIG. 1B, an insulating layer 2 made of alumina ($Al_2O_3$), for example, whose thickness is about 5 $\mu$m, is deposited on a substrate 1 made of aluminum oxide and titanium carbide ($Al_2O_3$—TiC), for example. On the insulating layer 2 a bottom shield layer 3 made of a magnetic material such as Permalloy and having a thickness of about 3 $\mu$m is formed for making a reproducing head. The bottom shield layer 3 is formed through plating selectively on the insulating layer 2 with a photoresist film as a mask, for example. Next, an insulating layer 20 of alumina, for example, having a thickness of 4 to 6 $\mu$m, for example, is formed over the entire surface. This insulating layer 20 is polished through chemical mechanical polishing (CMP), for example, so that the bottom shield layer 3 is exposed and the surface is flattened.

Next, as shown in FIG. 2A and FIG. 2B, on the bottom shield layer 3, alumina or aluminum nitride, for example, is deposited through sputtering to form a bottom shield gap film 4 as an insulating layer. On the bottom shield gap film 4, an MR element 5 for reproduction having a thickness of tens of nanometers is formed. The MR element 5 may be fabricated through selectively etching an MR film formed through sputtering. The MR element 5 may be an element made of a magnetosensitive film exhibiting a magnetoresistivity, such as an AMR element, a GMR element, or a tunnel magnetoresistive (TMR) element. Next, on the bottom shield gap film 4, a pair of electrode layers 6 having a thickness of tens of nanometers are formed. The electrode layers 6 are electrically connected to the MR element 5. Next, a top shield gap film 7 as an insulating layer is formed on the bottom shield gap film 4 and the MR element 5. The MR element 5 is embedded in the shield gap films 4 and 7.

Next, on the top shield gap film 7, a first portion 8a of a top-shield layer-cum-bottom-pole-layer (called a bottom pole layer in the following description) having a thickness of about 1.0 to 2.0 $\mu$m is selectively formed. The bottom pole layer is made of a magnetic material and used for both a reproducing head and a recording head. The first portion 8a faces part of a thin-film coil described later.

Next, an insulating layer 9 of alumina, for example, having a thickness of about 3 to 4 $\mu$m, for example, is formed over the entire surface. The insulating layer 9 is polished through CMP, for example, so that the first portion 8a of the bottom pole layer is exposed, and the surface is flattened.

Next, as shown in FIG. 3A and FIG. 3B, a second portion 8b and a third portion 8c of the bottom pole layer, each having a thickness of about 1.5 to 2.5 $\mu$m, are formed on the first portion 8a. The second portion 8b makes up a pole portion of the bottom pole layer and is connected to a surface of the first portion 8a that faces toward a top pole layer. The third portion 8c is provided for connecting the first portion 8a to a top pole layer. In this embodiment the throat height is defined by the position of an end of the second portion 8b opposite to the air bearing surface 30 (that is, the right side of FIG. 3A). That is, this position is the zero throat height position that is the position of an end of the pole portion opposite to the air bearing surface 30.

The second portion 8b and the third portion 8c of the bottom pole layer may be made of NiFe (80 weight % Ni and 20 weight % Fe), or NiFe (45 weight % Ni and 55 weight % Fe) as a high saturation flux density material and formed into specific patterns through plating, or may be made of a material such as FeN or FeZrN as a high saturation flux density material through sputtering, and then selectively etched through ion milling, for example, and formed into the specific patterns. Alternatively, a material such as CoFe or a Co-base amorphous material as a high saturation flux density material may be used.

Next, an insulating film 10 of alumina, for example, is formed over the entire surface. The thickness of the insulating film 10 is about 0.3 to 0.6 µm.

Next, although not shown, a seed layer is formed on the insulating film 10 through sputtering, for example, for making a first layer of the thin-film coil through plating. Next, a photoresist is applied to the top of the seed layer and patterned through a photolithography process to form a frame 11 used for plating.

Next, the first layer 12a of the thin-film coil made of copper (Cu), for example, is formed by frame plating through the use of the frame 11. For example, the thickness of the first layer 12a is about 1.0 to 2.0 µm. The first layer 12a is located on a side of the second portion 8b of the bottom pole layer. The first layer 12a is made up of a plurality of square-prism-shaped portions extending in the direction intersecting the drawing sheet of FIG. 3A.

Next, as shown in FIG. 4A and FIG. 4B, the frame 11 and the seed layer below it are removed, and an insulating layer 13 of alumina, for example, having a thickness of about 3 to 4 µm is formed over the entire surface. The insulating layer 13 is then polished through CMP, for example, until the second portion 8b and the third portion 8c of the bottom pole layer are exposed, and the surface is flattened. Although the first layer 12a of the coil is not exposed in FIG. 4A and FIG. 4B, the first layer 12a may be exposed.

Next, as shown in FIG. 5A and FIG. 5B, a recording gap layer 14 made of an insulating material whose thickness is about 0.2 to 0.3 µm, for example, is formed on the second portion 8b and the third portion 8c of the bottom pole layer and the insulating layer 13. In general, the insulating material used for the recording gap layer 14 may be alumina, aluminum nitride, a silicon-dioxide-base material, a silicon-nitride-base material, or diamond-like carbon (DLC) and so on.

Next, a portion of the recording gap layer 14 located on top of the third portion 8c is etched to form a contact hole for making the magnetic path.

Next, on the recording gap layer 14, the top pole layer 15 having a thickness of about 2.0 to 3.0 µm is formed. The top pole layer 15 may be made of NiFe (80 weight % Ni and 20 weight % Fe), or NiFe (45 weight % Ni and 55 weight % Fe) as a high saturation flux density material and formed into a specific pattern through plating, or may be made of a material such as FeN or FeZrN as a high saturation flux density material through sputtering and then selectively etched into the specific pattern through ion milling, for example. Alternatively, a material such as CoFe or a Co-base amorphous material as a high saturation flux density material may be used. In order to improve the high frequency characteristic, the top pole layer 15 may be made up of layers of inorganic insulating films and magnetic layers of Permalloy, for example.

Next, the recording gap layer 14 is selectively etched through dry etching, using the top pole layer 15 as a mask. The dry etching may be reactive ion etching (RIE) using a chlorine-base gas such as $BCl_2$ or $Cl_2$, or a fluorine-base gas such as $CF_4$ or $SF_6$, for example. Next, the second portion 8b of the bottom pole layer is selectively etched by about 0.3 to 0.6 µm through argon ion milling, for example. A trim structure as shown in FIG. 5B is thus formed. The trim structure suppresses an increase in the effective track width due to expansion of a magnetic flux generated during writing in a narrow track.

Next, an insulating film 16 of alumina, for example, is formed over the entire surface. The thickness of the insulating film 16 is about 0.3 to 0.9 µm.

Next, although not shown, contact holes are formed through RIE or ion milling, for example, in portions on top of both ends of each of the square-prism-shaped portions of the first layer 12a of the coil. Those contact holes penetrate the insulating film 16, the recording gap layer 14 and the insulating layer 13, and reach the first layer 12a.

Next, a second layer 12b of the thin-film coil made of copper (Cu), for example, is formed by frame plating on a portion of the insulating film 16 located on top of the top pole layer 15. For example, the thickness of the second layer 12b is about 1.0 to 2.0 µm. The second layer 12b is made up of a plurality of square-prism-shaped portions extending in the direction orthogonal to the drawing sheet of FIG. 5A. Both ends of each of the square-prism-shaped portions of the second layer 12b of the coil are connected to both ends of each of the square-prism-shaped portions of the first layer 12a through coupling portions made of the above-described contact holes filled with the material of the thin-film coil.

Next, as shown in FIG. 6A and FIG. 6B, an overcoat layer 17 of alumina, for example, having a thickness of 20 to 40 µm, for example, is formed over the entire surface. The surface of the overcoat layer 17 is then flattened and pads (not shown) for electrodes are formed on the overcoat layer 17. Finally, lapping of the slider is performed to form the air bearing surface 30 of the thin-film magnetic head including the recording head and the reproducing head. The thin-film magnetic head of the embodiment is thus completed.

In this embodiment the bottom pole layer made up of the first portion 8a, the second portion 8b and the third portion 8c corresponds to a first magnetic layer of the invention. The top pole layer 15 corresponds to a second magnetic layer of the invention. The bottom shield layer 3 corresponds to a first shield layer of the invention. Since the bottom pole layer also functions as the top shield layer, the bottom pole layer corresponds to a second shield layer of the invention, too.

Figure 7:
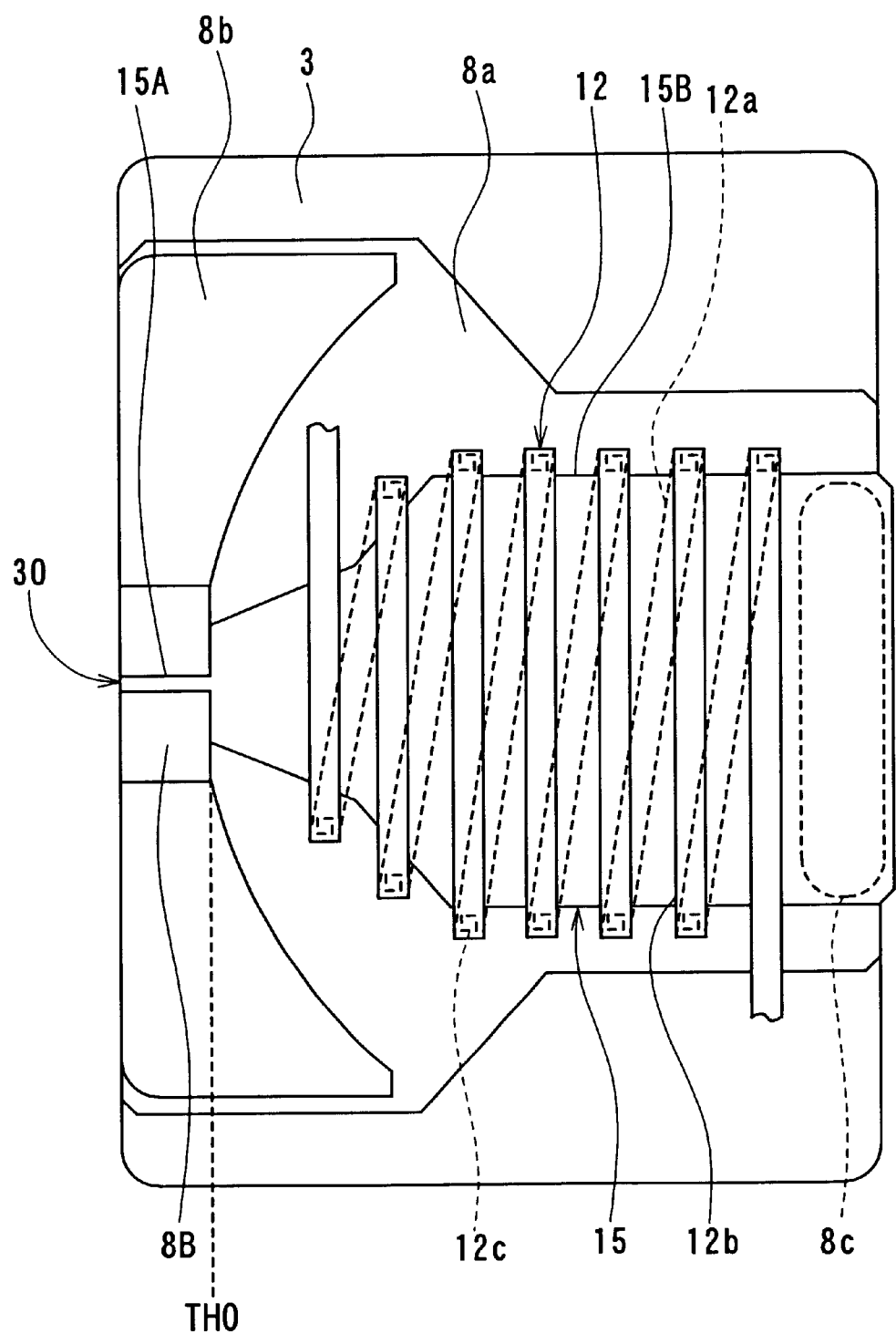
FIG. 7 is a top view of the thin-film magnetic head of the first embodiment.

FIG. 7 is a top view of the thin-film magnetic head of the embodiment. The overcoat layer 17 and the other insulating layers and films are omitted in FIG. 7. In FIG. 7 numeral 8B indicates a portion of the second portion 8b of the bottom pole layer etched to make the trim structure.

As shown in FIG. 7, the top pole layer 15 has: the pole portion 15A located in a region facing the second portion 8b of the bottom pole layer, the recording gap layer 14 being placed between the second portion 8b and the pole portion 15A; and the yoke portion 15B coupled to the pole portion 15A and located in a region facing the first layer 12a of the thin-film coil. The portion coupling the pole portion 15A to the yoke portion 15B is located in zero throat height position TH0 or a neighborhood thereof. The pole portion 15A has a specific narrow width. The width of the pole portion 15A defines the track width of the recording head.

In FIG. 7 numeral 12 indicates the thin-film coil including the first layer 12a, the second layer 12b and portions 12c coupling the first layer 12a to the second layer 12b. The first layer 12a is coupled to the second layer 12b through the coupling portions 12c in a zigzag manner. The thin-film coil 12 is thereby wound around the yoke portion 15B of the top pole layer 15 in a helical manner.

As described so far, the thin-film magnetic head of the embodiment comprises the reproducing head and the recording head (induction-type magnetic transducer). The reproducing head has: the MR element 5; and the bottom shield layer 3 and the top shield layer (bottom pole layer) for shielding the MR element 5. Portions of the bottom shield layer 3 and the top shield layer facing toward a recording medium are opposed to each other, the MR element 5 being placed between the portions.

The recording head has the bottom pole layer (including the portions 8a to 8c) and the top pole layer 15 magnetically coupled to each other, each of which includes at least one layer. The bottom pole layer and the top pole layer include pole portions opposed to each other and placed in regions on a side of the medium facing surface (the air bearing surface). The recording head further has: the recording gap layer 14 placed between the pole portion of the bottom pole layer and the pole portion of the top pole layer 15; and the thin-film coil 12 helically wound around the top pole layer 15 and insulated from the bottom pole layer and the top pole layer 15, part of the coil 12 passing between the bottom pole layer and the top pole layer 15.

In the embodiment the bottom pole layer has: the first portion 8a facing the first layer 12a of the thin-film coil; and the second portion 8b connected to a surface of the first portion 8a facing the top pole layer 15. The second portion 8b forms the pole portion. The first layer 12a of the coil is placed on a side of the second portion 8b.

In this embodiment the thin-film coil 12 is helically wound around the top pole layer 15. As a result, the magetomotive force generated by the coil 12 is supplied to the top pole layer 15 with efficiency. It is therefore possible that the number of turns of the coil 12 is smaller than that of a head having a flat-whorl-shaped thin-film coil.

In the embodiment the first layer 12a of the thin-film coil 12 is placed on top of the first portion 8a and on the side of the second portion 8b of the bottom pole layer, and the top surface of the insulating layer 13 that covers the first layer 12a is flattened. The top pole layer 15 is then formed on the flat surface. As a result, both the first layer 12a and the second layer 12b of the coil 12 are formed on the flat surface. The dimensions of the coil 12 are thereby reduced.

According to the embodiment, an end of the thin-film coil 12 is located near zero throat height position TH0 since no apex exists.

As thus described, according to the embodiment, the yoke length is reduced down to about 30 to 50 percent or less of that of a prior-art head, for example. Furthermore, the magnetomotive force generated by the coil 12 is prevented from saturating halfway and to utilize the magnetomotive force for writing with efficiency. It is therefore possible to provide a thin-film magnetic head having a recording head with an excellent high frequency characteristic, an excellent nonlinear transition shift (NLTS) characteristic and an excellent overwrite property that is a parameter indicating one of characteristics when data is written over existing data, according to the embodiment.

In the embodiment the first layer 12a of the thin-film coil 12 is placed on top of the first portion 8a and on the side of the second portion 8b of the: bottom pole layer, and the top surface of the insulating layer 13 that covers the first layer 12a is flattened. As a result, the top pole layer 15 that defines the track width of the recording head is formed on the flat surface. Therefore, according to the embodiment, the dimensions of the pole portion 15A of the top pole layer 15 may be reduced to the half-micron or quarter-micron order. The track width of the recording head is thereby reduced. It is thereby possible to implement a thin-film magnetic head having surface recording density of 20 to 30 gigabits per square inch that meets a future demand.

According to the embodiment, the throat height is not defined by the top pole layer 15 that defines the track width of the recording head, but by the second portion 8b of the bottom pole layer. As a result, the throat height is uniformly defined with accuracy even if the track width is reduced.

According to the embodiment, the insulating layer 13 is provided to cover the first layer 12a of the coil 12 placed on a side of the second portion 8b of the bottom pole layer. The top surface of the insulating layer 13 is flattened. It is therefore easy to form the recording gap layer 14, the top pole layer 15 and the second layer 12b of the coil 12 and so on that are fabricated later.

According to the embodiment, the inorganic insulating film 10 that is thin and achieves sufficient insulation strength is provided between the bottom pole layer and the first layer 12a of the coil 12. High insulation strength is thereby obtained between the bottom pole layer and the first layer 12a.

According to the embodiment, as shown in FIG. 7, a portion of the top pole layer 15 farther from the air bearing surface 30 than zero throat height position TH0 or the neighborhood thereof has a specific width of 3 $\mu$m or greater, for example. A portion of the top pole layer 15 closer to the air bearing surface 30 than zero throat height position TH0 or the neighborhood thereof has a specific width of the half-micron or quarter-micron order. As a result, a magnetic flux passing through the top pole layer 15 will not saturate in the portion farther from the air bearing surface 30 than zero throat height position TH0 or the neighborhood thereof, but saturates in the portion closer to the air bearing surface 30 than zero throat height position TH0 or the neighborhood thereof. It is thereby possible to improve NLTS and the overwrite property.

Second Embodiment

Figures 8A, 8B:
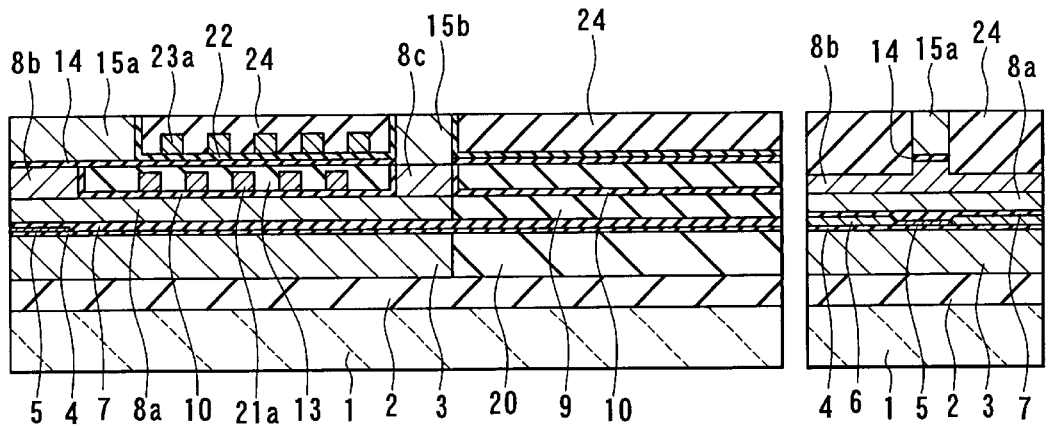
FIG. 8A and FIG. 8B are cross sections for illustrating a step in a method of manufacturing of a thin-film magnetic head of a second embodiment of the invention.
Figures 9A, 9B:
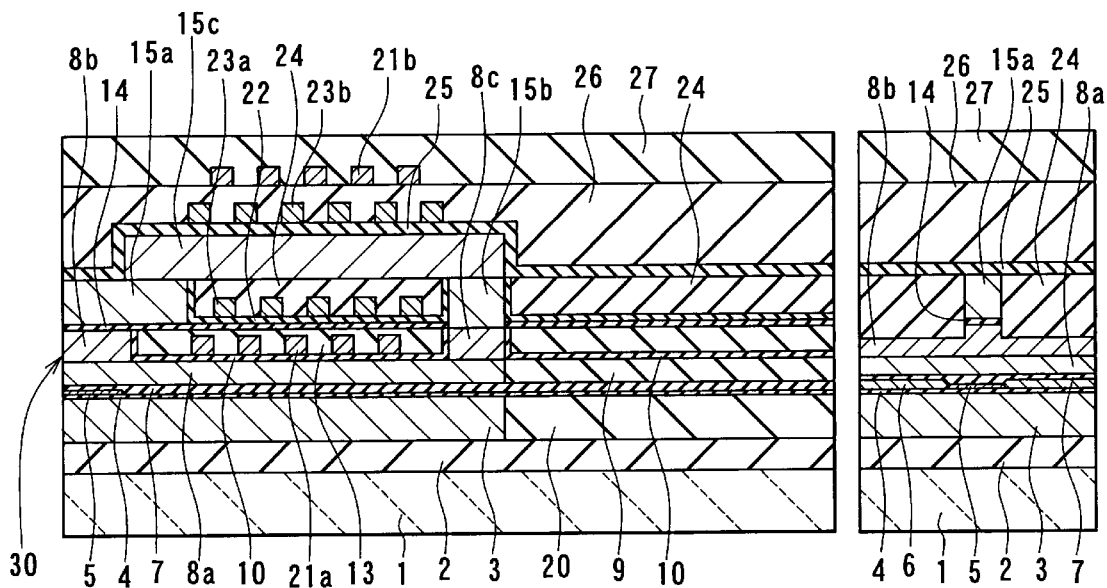
FIG. 9A and FIG. 9B are cross sections of the thin-film magnetic head of the second embodiment.

Reference is now made to FIG. 8A, FIG. 8B, FIG. 9A, FIG. 9B and FIG. 10 to describe a thin-film magnetic head and a method of manufacturing the same of a second embodiment of the invention. FIG. 8A and FIG. 9A are cross sections orthogonal to an air bearing surface. FIG. 8B and FIG. 9B are cross sections of a pole portion parallel to the air bearing surface.

The thin-film magnetic head of the second embodiment comprises a thin-film coil wound doubly around the top pole layer in a helical manner. In this embodiment an outer portion of the coil is called a first portion and an inner portion is called a second portion. Each of the first and second portions of the coil may be made of copper, for example.

The steps of the method of manufacturing the thin-film magnetic head of the second embodiment that are taken until the insulating film 10 is formed are similar to those of the first embodiment. In the following step of the second embodiment, as shown in FIG. 8A and FIG. 8B, a first layer 21a of the first portion of the thin-film coil is formed by frame plating on the insulating film 10. The thickness of the first layer 21a is about 1.0 to 2.0 $\mu$m, for example. The first layer 21a is located on a side of the second portion 8b of the bottom pole layer. The first layer 21a is made up of a plurality of square-prism-shaped portions extending in the direction intersecting the drawing sheet of FIG. 8A.

Next, the insulating layer 13 of alumina, for example, having a thickness of about 3 to 4 $\mu$m is formed over the entire surface. The insulating layer 13 is then polished through CMP, for example, until the second portion 8b and the third portion 8c of the bottom pole layer are exposed, and the surface is flattened. Although the first layer 21a of the first portion of the coil is not exposed in FIG. 8A and FIG. 8B, the first layer 21a may be exposed.

Next, the recording gap layer 14 made of an insulating material whose thickness is about 0.2 to 0.3 μm, for example, is formed on the second portion 8b and the third portion 8c of the bottom pole layer and the insulating layer 13. Next, a portion of the recording gap layer 14 located on top of the third portion 8c is etched to form a contact hole.

Next, on the recording gap layer 14, a pole portion layer 15a having a thickness of 1.0 to 3.0 μm is formed. The pole portion layer 15a makes up the pole portion of the top pole layer. A magnetic layer 15b having a thickness of 1.0 to 3.0 μm is formed in the contact hole formed in the third portion 8c of the bottom pole layer. The magnetic layer 15b is provided for connecting a yoke portion of the top pole layer described later to the bottom pole layer. In this embodiment the pole portion layer 15a is equal to or greater than the second portion 8b of the bottom pole layer in length.

The pole portion layer 15a and the magnetic layer 15b of the top pole layer may be made of NiFe (80 weight % Ni and 20 weight % Fe), or NiFe (45 weight % Ni and 55 weight % Fe) as a high saturation flux density material and formed into a specific pattern through plating, or may be made of a material such as FeN or FeZrN as a high saturation flux density material through sputtering and then selectively etched into the specific pattern through ion milling, for example. Alternatively, a material such as CoFe or a Co-base amorphous material as a high saturation flux density material may be used.

Next, the recording gap layer 14 is selectively etched through dry etching, using the pole portion layer 15a of the top pole layer as a mask. Next, the second portion 8b of the bottom pole layer is selectively etched by about 0.3 to 0.6 μm through argon ion milling, for example. A trim structure as shown in FIG. 8B is thus formed.

Next, an insulating film 22 of alumina, for example, is formed in a region where the coil is to be formed on top of the recording gap layer 14. The thickness of the insulating film 22 is about 0.3 to 0.6 μm.

Next, a first layer 23a of the second portion of the thin-film coil is formed by frame plating. The thickness of the first layer 23a is about 1.0 to 2.0 μm, for example. The first layer 23a is located on a side of the pole portion layer 15a of the top pole layer. The first layer 23a is made up of a plurality of square-prism-shaped portions extending in the direction intersecting the drawing sheet of FIG. 8A.

Next, an insulating layer 24 of alumina, for example, having a thickness of about 3 to 4 μm is formed over the entire surface. The insulating layer 24 is then polished through CMP, for example, until the pole portion layer 15a and the magnetic layer 15b are exposed, and the surface is flattened.

Next, as shown in FIG. 9A and FIG. 9B, on the pole portion layer 15a and the magnetic layer 15b of the top pole layer and the insulating layer 24 flattened, a yoke portion layer 15c of the top pole layer is formed. The yoke portion layer 15c has a thickness of about 2 to 4 μm, for example, and makes up the yoke portion of the top pole layer. The yoke portion layer 15c is in contact with and magnetically coupled to the third portion 8c of the bottom pole layer through the magnetic layer 15b. The yoke portion layer 15c may be made of NiFe (80 weight % Ni and 20 weight % Fe), or NiFe (45 weight % Ni and 55 weight % Fe) as a high saturation flux density material and formed into a specific pattern through plating, or may be made of a material such as FeN or FeZrN as a high saturation flux density material through sputtering and then selectively etched into the specific pattern through ion milling, for example. Alternatively, a material such as CoFe or a Co-base amorphous material as a high saturation flux density material may be used. In order to improve the high frequency characteristic, the yoke portion layer 15c may be made up of layers of inorganic insulating films and magnetic layers of Permalloy, for example.

In this embodiment an end face of the yoke portion layer 15c that faces toward a recording medium (that is, an end face that faces toward the air bearing surface 30) is located at a distance from the surface of the thin-film magnetic head that faces toward the recording medium (that is, located on the right side of FIG. 9A).

Next, an insulating film 25 of alumina, for example, is formed over the entire surface. The thickness of the insulating film 25 is about 0.3 to 0.9 μm.

Next, although not shown, contact holes are formed through RIE or ion milling, for example, in portions on top of both ends of each of the square-prism-shaped portions of the first layer 23a of the second portion of the coil. Those contact holes penetrate the insulating film 25 and the insulating layer 24, and reach the first layer 23a.

Next, a second layer 23b of the second portion of the thin-film coil is formed by frame plating on a portion of the insulating film 25 located on top of the yoke portion layer 15c of the top pole layer. The thickness of the second layer 23b is about 1.0 to 2.0 μm, for example. The second layer 23b is made up of a plurality of square-prism-shaped portions extending in the direction orthogonal to the drawing sheet of FIG. 9A. Both ends of each of the square-prism-shaped portions of the second layer 23b are connected to both ends of each of the square-prism-shaped portions of the first layer 23a through coupling portions made of the above-described contact holes filled with the material of the thin-film coil.

Next, an insulating layer 26 of alumina, for example, is formed over the entire surface. The thickness of the insulating layer 26 is about 6 to 8 μm, for example. The surface of the insulating layer 26 is then flattened.

Next, although not shown, contact holes are formed through RIE or ion milling, for example, in portions on top of both ends of each of the square-prism-shaped portions of the first layer 21a of the first portion of the coil. Those contact holes penetrate the insulating films 26 and 25, the recording gap layer 14 and the insulating layer 13, and reach the first layer 21a.

Next, a second layer 21b of the first portion of the thin-film coil is formed by frame plating on the insulating layer 26. The thickness of the second layer 21b is about 1.0 to 2.0 μm, for example. The second layer 21b is made up of a plurality of square-prism-shaped portions extending in the direction orthogonal to the drawing sheet of FIG. 9A. Both ends of each of the square-prism-shaped portions of the second layer 21b are connected to both ends of each of the square-prism-shaped portions of the first layer 21a through coupling portions made of the above-described contact holes filled with the material of the thin-film coil.

Next, the overcoat layer 17 of alumina, for example, having a thickness of 20 to 40 μm, for example, is formed over the entire surface. The surface of the overcoat layer 17 is then flattened and pads (not shown) for electrodes are formed on the overcoat layer 17. Finally, lapping of the slider is performed to form the air bearing surfaces 30 of the recording head and the reproducing head. The thin-film magnetic head of the embodiment is thus completed.

In this embodiment the top pole layer made up of the pole portion layer 15a, the magnetic layer 15b and the yoke portion layer 15c corresponds to the second magnetic layer of the invention.

Figure 10:
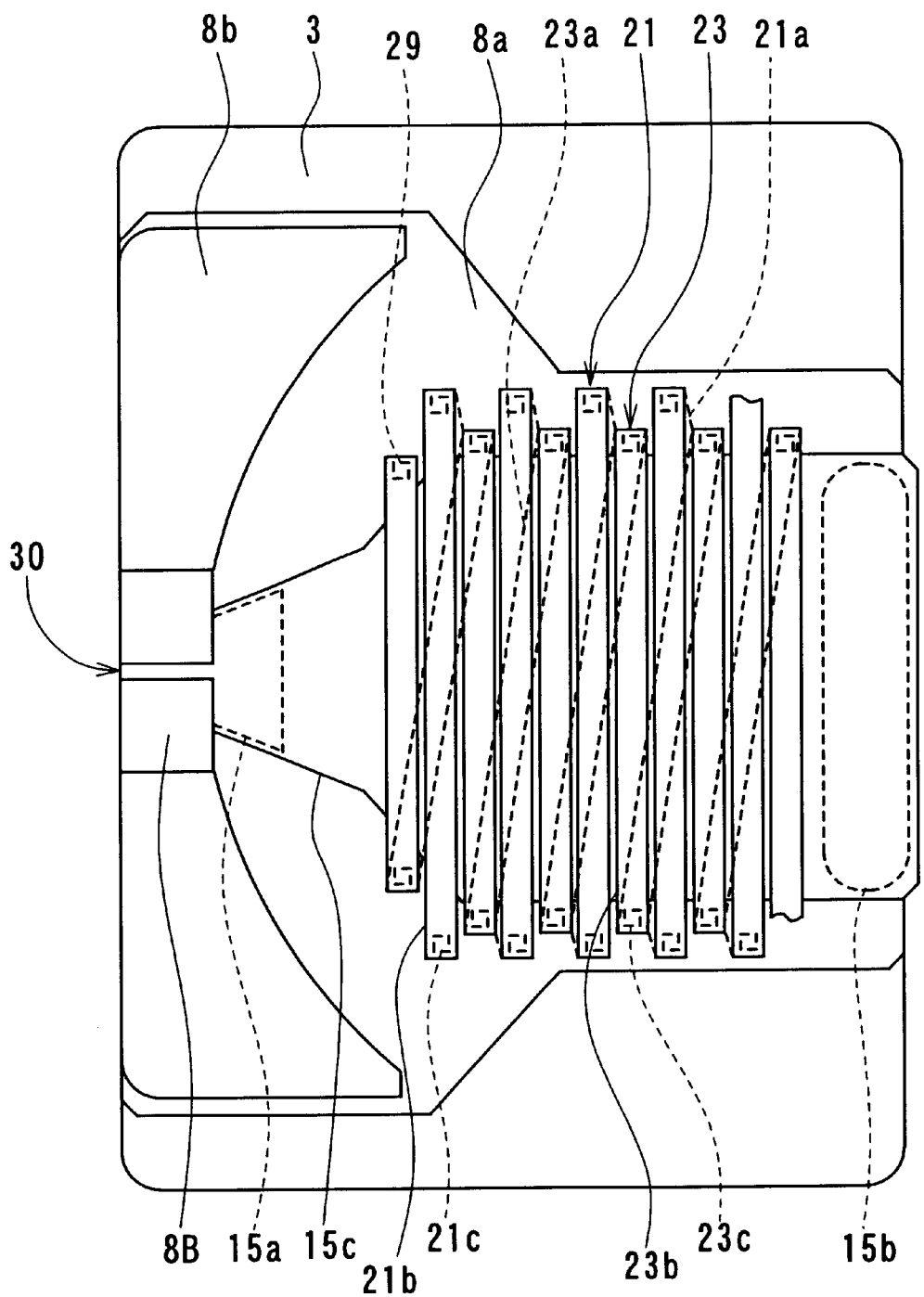
FIG. 10 is a top view of the thin-film magnetic head of the second embodiment.

FIG. 10 is a top view of the thin-film magnetic head of the embodiment. The overcoat layer and the other insulating layers and films are omitted in FIG. 10. In FIG. 10 numeral 21 indicates the first portion of the thin-film coil including the first layer 21a, the second layer 21b and the portions 21c for coupling the first layer 21a to the second layer 21b. Numeral 23 indicates the second portion of the thin-film coil including the first layer 23a, the second layer 23b and the portions 23c for coupling the first layer 23a to the second layer 23b. The first layer 21a and the second layer 21b of the first portion 21 of the coil are coupled to each other through the coupling portions 21c in a zigzag manner. The first portion 21 is thereby wound around the yoke portion layer 15c of the top pole layer in a helical manner. Similarly, the first layer 23a and the second layer 23b of the second portion 23 of the coil are coupled to each other through the coupling portions 23c in a zigzag manner. The second portion 23 is thereby wound around the yoke portion layer 15c of the top pole layer in a helical manner.

The first portion 21 and the second portion 23 of the coil are coupled to each other through a coupling portion 29. The coupling portion 29 is made of a contact hole filled with the material of the thin-film coil, the contact hole penetrating the insulating film 25, the recording gap layer 14 and the insulating layer 13 and reaching the first layer 21a of the first portion 21 of the coil.

As shown in FIG. 9A and FIG. 9B, the first layer 21a of the first portion 21 passes by a side of the second portion 8b of the bottom pole layer. The first layer 23a of the second portion 23 passes by a side of the pole portion layer 15a of the top pole layer.

In this embodiment the thin-film coil including the portions 21 and 23 is wound doubly around the top pole layer in a helical manner. As a result, the magnetomotive force generated by the coil is made greater, compared to the first embodiment. It is therefore possible to improve NLTS and the overwrite property.

In the embodiment the first layer 21a of the first portion 21 of the coil is placed on the side of the second portion 8b of the bottom pole layer, and the top surface of the insulating layer 13 that covers the first layer 21a is flattened. As a result, the pole portion layer 15a of the top pole layer is formed on the flat surface. It is thereby possible to reduce the dimensions of the pole portion layer 15a to the half-micron or quarter-micron order. The track width of the recording head is thereby reduced.

According to the embodiment, the doubly-wound thin-film coil including the portions 21 and 23 is provided. The first layer 21a of the first portion 21 of the coil is placed on the side of the second portion 8b of the bottom pole layer. In addition, the first layer 23a of the second portion 23 of the coil is placed on the side of the pole portion layer 15a of the top pole layer. As a result, the yoke portion layer 15c of the top pole layer is formed on the flat surface. Therefore, according to the embodiment, the dimensions of the yoke portion layer 15c may be reduced, too. So-called side write is thereby prevented.

According to the embodiment, an end face of the yoke portion layer 15c facing toward the air bearing surface 30 is located at a distance from the air bearing surface 30 of the thin-film magnetic head. As a result, it is impossible that the yoke portion layer 15c is exposed from the air bearing surface 30 even if the throat height is low. Side write is thereby prevented.

The remainder of the configuration, operations and effects of the second embodiment are similar to those of the first embodiment.

Third Embodiment

Reference is now made to FIG. 11A, FIG. 11B, FIG. 12A, FIG. 12B and FIG. 13 to describe a thin-film magnetic head and a method of manufacturing the same of a third embodiment of the invention. FIG. 11A and FIG. 12A are cross sections orthogonal to an air bearing surface. FIG. 11B and FIG. 12B are cross sections of a pole portion parallel to the air bearing surface.

The thin-film magnetic head of the third embodiment comprises a thin-film coil having a first portion wound around the bottom pole layer in a helical manner and a second portion wound around the top pole layer in a helical manner. Each of the first and second portions of the coil may be made of copper, for example.

The steps of the method of manufacturing the thin-film magnetic head of the third embodiment that are taken until the bottom shield gap film 4, the MR element 5 and the top shield gap film 7 are formed are similar to those of the first embodiment. In the following step of the third embodiment, as shown in FIG. 11A and FIG. 11B, a magnetic layer 8d made of a magnetic material having a thickness of about 1 to 2 $\mu$m, for example, is formed on the top shield gap film 7 located on the MR element 5. The magnetic layer 8d makes up part of the bottom shield layer. Next, through RIE or ion milling, for example, a concavity is formed in a region where the thin-film coil is to be formed by etching portions of the shield gap films 4 and 7 and etching a portion of the bottom shield layer 3 by about 1 to 2 $\mu$m, for example.

Next, an insulating film 31 of alumina, for example, having a thickness of about 0.3 to 0.6 $\mu$m is formed over the entire surface. Next, a first layer 32a of the first portion of the thin-film coil is formed by frame plating on the insulating film 31. The thickness of the first layer 32a is about 1.0 to 2.0 $\mu$m, for example. The first layer 32a is made up of a plurality of square-prism-shaped portions extending in the direction intersecting the drawing sheet of FIG. 11A.

Next, an insulating layer 33 of alumina, for example, having a thickness of about 3 to 4 $\mu$m is formed over the entire surface. The insulating layer 33 is then polished through CMP, for example, until the magnetic layer 8d is exposed, and the surface is flattened.

Next, as shown in FIG. 12A and FIG. 12B, the first portion 8a of the bottom pole layer is selectively formed on the magnetic layer 8d and the insulating layer 33. The first portion 8a has a thickness of about 1.0 to 2.0 $\mu$m, for example. Next, the insulating layer 9 of alumina, for example, having a thickness of about 3 to 4 $\mu$m is formed over the entire surface. The insulating layer 9 is then polished through CMP, for example, until the first portion 8a is exposed, and the surface is flattened.

Next, the second portion 8b and the third portion 8c of the bottom pole layer, each having a thickness of about 1.5 to 2.5 $\mu$m, are formed on the first portion 8a. Next, the insulating film 10 of alumina, for example, having a thickness of about 0.3 to 0.6 $\mu$m is formed over the entire surface.

Next, although not shown, contact holes are formed through RIE or ion milling, for example, in portions on top of both ends of each of the square-prism-shaped portions of the first layer 32a of the first portion of the coil. Those contact holes penetrate the insulating film 10 and the insulating layer 33, and reach the first layer 32a.

Next, a second layer 32b of the first portion of the thin-film coil is formed by frame plating on the insulating film 10. The thickness of the second layer 32b is about 1.0 to 2.0 µm, for example. The second layer 32b is located on a side of the second portion 8b of the bottom pole layer. The second layer 32b is made up of a plurality of square-prism-shaped portions extending in the direction orthogonal to the drawing sheet of FIG. 12A. Both ends of each of the square-prism-shaped portions of the second layer 32b are connected to both ends of each of the square-prism-shaped portions of the first layer 32a through coupling portions made of the above-described contact holes filled with the material of the thin-film coil.

Next, the insulating layer 13 of alumina, for example, having a thickness of about 3 to 4 µm is formed over the entire surface. The insulating layer 13 is then polished through CMP, for example, until the second portion 8b and the third portion 8c of the bottom pole layer are exposed, and the surface is flattened. Although the second layer 32b of the first portion of the coil is not exposed in FIG. 12A and FIG. 12B, the second layer 32b may be exposed.

Next, the recording gap layer 14 whose thickness is 0.2 to 0.3 µm, for example, is formed on the second portion 8b and the third portion 8c of the bottom pole layer and the insulating layer 13. Next, a portion of the recording gap layer 14 located on top of the third portion 8c is etched to form a contact hole.

Next, on the recording gap layer 14, the pole portion layer 15a having a thickness of 1.0 to 3.0 µm is formed. The pole portion layer 15a makes up the pole portion of the top pole layer. The magnetic layer 15b having a thickness of 1.0 to 3.0 µm is formed in the contact hole formed in the third portion 8c of the bottom pole layer.

Next, the recording gap layer 14 is selectively etched through dry etching, using the pole portion layer 15a of the top pole layer as a mask. Next, the second portion 8b of the bottom pole layer is selectively etched by about 0.3 to 0.6 µm through argon ion milling, for example. A trim structure as shown in FIG. 12B is thus formed.

Next, the insulating film 22 of alumina, for example, is formed in a region where the coil is to be formed on top of the recording gap layer 14. The thickness of the insulating film 22 is about 0.3 to 0.6 µm. Next, a first layer 34a of the second portion of the thin-film coil is formed by frame plating. The thickness of the first layer 34a is about 1.0 to 2.0 µm, for example. The first layer 34a is located on a side of the pole portion layer 15a of the top pole layer. The first layer 34a is made up of a plurality of square-prism-shaped portions extending in the direction intersecting the drawing sheet of FIG. 12A.

Next, the insulating layer 24 of alumina, for example, having a thickness of about 3 to 4 µm is formed over the entire surface. The insulating layer 24 is then polished through CMP, for example, until the pole portion layer 15a and the magnetic layer 15b are exposed, and the surface is flattened.

Next, the yoke portion layer 15c of the top pole layer is formed on the pole portion layer 15a and the magnetic layer 15b of the top pole layer and the insulating layer 24 flattened. The yoke portion layer 15c has a thickness of about 2 to 4 µm, for example.

Next, the insulating film 25 of alumina, for example, is formed over the entire surface. The thickness of the insulating film 25 is about 0.3 to 0.9 µm.

Next, although not shown, contact holes are formed through RIE or ion milling, for example, in portions on top of both ends of each of the square-prism-shaped portions of the first layer 34a of the second portion of the coil. Those contact holes penetrate the insulating film 25 and the insulating layer 24, and reach the first layer 34a.

Next, a second layer 34b of the second portion of the thin-film coil is formed by frame plating on a portion of the insulating film 25 located on top of the yoke portion layer 15c of the top pole layer. The thickness of the second layer 34b is about 1.0 to 2.0 µm, for example. The second layer 34b is made up of a plurality of square-prism-shaped portions extending in the direction orthogonal to the drawing sheet of FIG. 12A. Both ends of each of the square-prism-shaped portions of the second layer 34b are connected to both ends of each of the square-prism-shaped portions of the first layer 34a through coupling portions made of the above-described contact holes filled with the material of the thin-film coil.

Next, an overcoat layer 27 of alumina, for example, having a thickness of 20 to 40 µm, for example, is formed over the entire surface. The surface of the overcoat layer 27 is then flattened and pads (not shown) for electrodes are formed on the overcoat layer 27. Finally, lapping of the slider is performed to form the air bearing surfaces of the recording head and the reproducing head. The thin-film magnetic head of the embodiment is thus completed.

Figure 13:
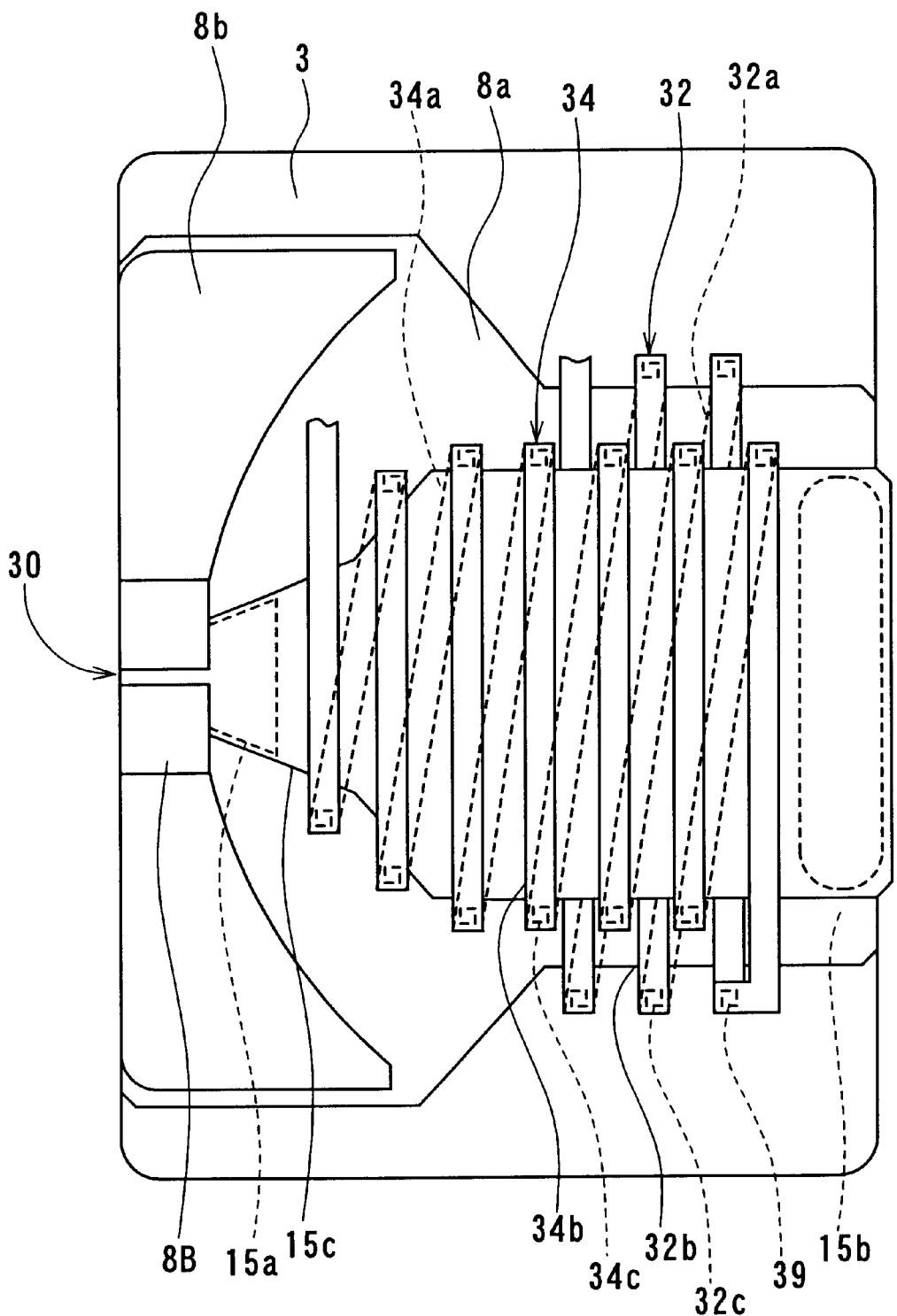
FIG. 13 is a top view of a thin-film magnetic head of the third embodiment.
Figures 16A, 16B:
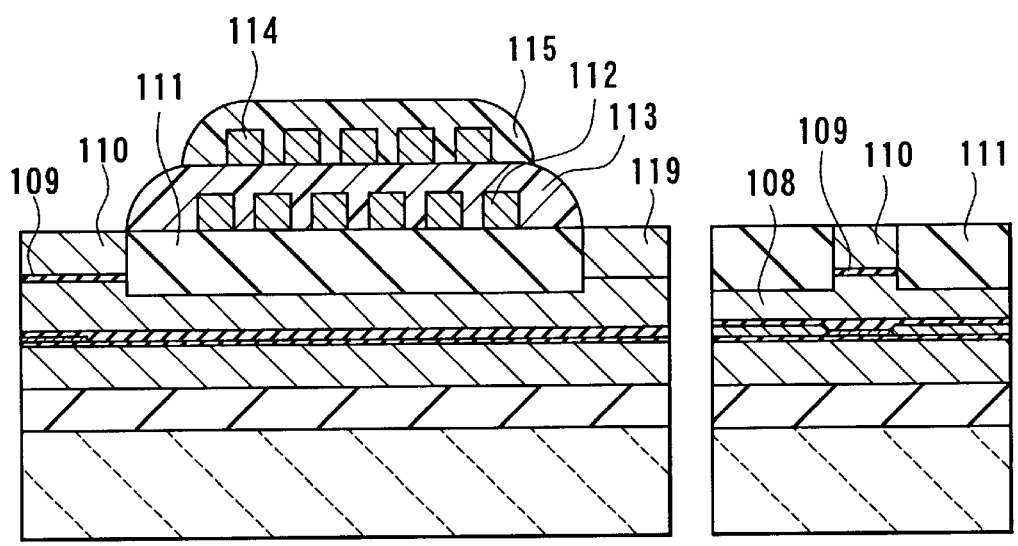
FIG. 16A and FIG. 16B are cross sections for illustrating a step that follows FIG. 15A and FIG. 15B.
Figures 17A, 17B:
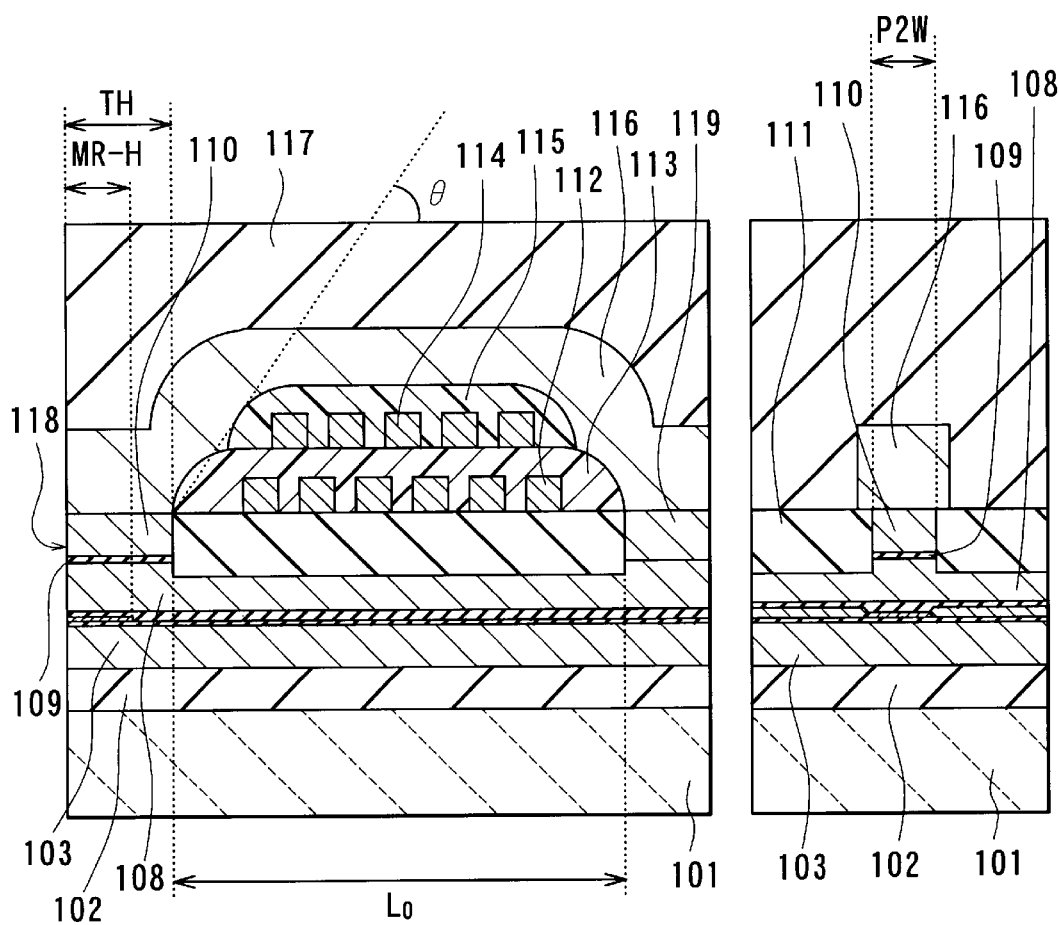
FIG. 17A and FIG. 17B are cross sections for illustrating a step that follows FIG. 16A and FIG. 16B.

FIG. 13 is a top view of the thin-film magnetic head of the embodiment, wherein the overcoat layer and the other insulating layers and films are omitted. In FIG. 13 numeral 32 indicates the first portion of the thin-film coil including the first layer 32a, the second layer 32b and the portions 32c for coupling the first layer 32a to the second layer 32b. In FIG. 13 part of the first portion 32 is omitted. Numeral 34 indicates the second portion of the thin-film coil including the first layer 34a, the second layer 34b and the portions 34c for coupling the first layer 34a to the second layer 34b. The first layer 32a and the second layer 32b of the first portion 32 of the coil are coupled to each other through the coupling portions 32c in a zigzag manner. The first portion 32 is thereby wound around the first portion 8a of the bottom pole layer in a helical manner. Similarly, the first layer 34a and the second layer 34b of the second portion 34 of the coil are coupled to each other through the coupling portions 34c in a zigzag manner. The second portion 34 is thereby wound around the yoke portion layer 15c of the top pole layer in a helical manner.

The first portion 32 and the second portion 34 of the coil are coupled to each other through a coupling portion 39. The coupling portion 39 is made of a contact hole filled with the material of the thin-film coil, the contact hole penetrating the insulating film 25, the recording gap layer 14 and the insulating layer 13 and reaching the second layer 32b of the first portion 32 of the coil.

As shown in FIG. 12A and FIG. 12B, the second layer 32b of the first portion 32 passes by a side of the second portion 8b of the bottom pole layer. The first layer 34a of the second portion 34 passes by a side of the pole portion layer 15a of the top pole layer.

In this embodiment the thin-film coil includes the first portion 32 wound around the bottom pole layer in a helical manner and the second portion 34 wound around the top pole layer in a helical manner. As a result, the magnetomotive force generated by the coil is made greater, compared to the first embodiment. It is therefore possible to further improve NLTS and the overwrite property.

The remainder of the configuration, operations and effects of the third embodiment are similar to those of the first or second embodiment.

The present invention is not limited to the foregoing embodiments but may be practiced in still other ways. For example, although the bottom pole layer defines the throat height in the foregoing embodiments, the top pole layer may define the throat height.

In the foregoing embodiments the thin-film magnetic head is disclosed, comprising the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between. In this case it is preferred that the top pole layer of the induction-type magnetic transducer functions as the bottom shield layer of the MR element, too.

The invention may be applied to a thin-film magnetic head comprising an induction-type magnetic transducer only and used for writing only, or may be applied to a thin-film magnetic head performing writing and reading through an induction-type magnetic transducer.

According to the thin-film magnetic head or the method of manufacturing the same of the invention described so far, the thin-film coil is wound around at least one of the magnetic layers in a helical manner, and a portion of the coil passes between the first and second magnetic layers. As a result, the yoke length of the induction-type magnetic transducer is reduced. According to the invention, the first magnetic layer includes: the first portion facing the portion of the thin-film coil; and the second portion forming the pole portion and connected to a surface of the first portion facing the second magnetic layer. The portion of the coil is placed on a side of the second portion of the first magnetic layer. As a result, the second magnetic layer is formed on the flat surface. The track width of the induction-type magnetic transducer is thereby reduced.

According to the thin-film magnetic head or the method of manufacturing the same of the invention, the thin-film coil may be wound doubly around the second magnetic layer in a helical manner. In this case, the magnetomotive force generated by the coil is enhanced.

According to the thin-film magnetic head or the method of manufacturing the same of the invention, the thin-film coil may includes: the first portion wound around the first magnetic layer in a helical manner; and the second portion wound around the second magnetic layer in a helical manner. In this case, the magnetomotive force generated by the coil is further enhanced.

In the thin-film magnetic head or the method of manufacturing the same of the invention, the second magnetic layer may include the pole portion layer forming the pole portion, and the yoke portion layer forming the yoke portion and connected to the pole portion layer. In addition, an end face of the yoke portion layer that faces toward the medium facing surface may be located at a distance from the medium facing surface. In this case, it is possible to prevent writing of data in a region where data is not supposed to be written.

In the thin-film magnetic head or the method of manufacturing the same of the invention, the second portion of the first magnetic layer may define the throat height, and the second magnetic layer may define the recording track width. As a result, the throat height is uniformly defined with precision even if the track width is reduced.

According to the thin-film magnetic head or the method of manufacturing the same of the invention, the insulating layer may be provided to cover the portion of the thin-film coil placed on a side of the second portion of the first magnetic layer. A surface of the insulating layer facing the recording gap layer is flattened. In this case, it is easy to form the recording gap layer, the second magnetic layer and so on.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin-film magnetic head comprising:
    a medium facing surface that faces toward a recording medium;
    a first magnetic layer and a second magnetic layer magnetically coupled to each other and including magnetic pole portions opposed to each other and placed in regions on a side of the medium facing surface, each of the magnetic layers including at least one layer;
    a gap layer provided between the pole portions of the first and second magnetic layers; and
    a thin-film coil insulated from the first and second magnetic layers, a portion of the coil passing between the first and second magnetic layers; the method including the steps of:
    forming the first magnetic layer;
    forming the gap layer on the first magnetic layer;
    forming the second magnetic layer on the gap layer; and
    forming the coil such that the coil is wound around at least one of the magnetic layers in a helical manner and insulated from the first and second magnetic layers, a portion of the coil passing between the first and second magnetic layers; wherein:
        in the step of forming the first magnetic layer, the first magnetic layer is formed to include: a first layer facing the portion of the coil; and a second layer forming one of the pole portions and connected to a surface of the first layer facing the second magnetic layer;
        a difference in level is formed between the surface of the first layer facing the second magnetic layer and a surface of the second layer facing the gap layer; and
        the portion of the coil is located on a side of the second layer of the first magnetic layer and between a level of a bottom surface of the second layer and a level of a top surface of the second layer in the step of forming the coil.

2. The method according to claim 1 wherein the thin-film coil is formed to include a portion wound around the second magnetic layer in a helical manner in the step of forming the coil.

3. The method according to claim 1 wherein the step of forming the second magnetic layer includes formation of: a magnetic pole portion layer forming one of the pole portions; and a yoke portion layer connected to the pole portion layer and forming a yoke portion.

4. The method according to claim 3 wherein the step of forming the thin-film coil includes formation of: a first portion that passes by a side of the second layer of the first magnetic layer and is wound around the second magnetic layer in a helical manner; and a second portion that passes by a side of the pole portion of the second magnetic layer and is wound around the second magnetic layer in a helical manner.

5. The method according to claim 3 wherein the step of forming the thin-film coil includes formation of: a first portion that passes by a side of the second layer of the first magnetic layer and is wound around the first magnetic layer in a helical manner; and a second portion that passes by a side of the pole portion layer of the second magnetic layer and is wound around the second magnetic layer in a helical manner.

6. The method according to claim 3 wherein an end face of the yoke portion layer that faces toward the medium facing surface is located at a distance from the medium facing surface in the step of forming the second magnetic layer.

7. The method according to claim 1 wherein:

the first magnetic layer is formed such that the second layer defines a throat height in the step of forming the first magnetic layer; and the second magnetic layer is formed to define a recording track width in the step of forming the second magnetic layer.

8. The method according to claim 1, further including the step of forming an insulating layer that covers the portion of the coil located on the side of the second layer of the first magnetic layer, a surface of the insulating layer that faces the gap layer being flattened.

9. The method according to claim 1, further including the step of forming: a magnetoresistive element; and a first shield layer and a second shield layer for shielding the magnetoresistive element, portions of the first and second shield layers located in regions on a side of the medium facing surface being opposed to each other, the magnetoresistive element being placed between the portions of the shield layers.

10. The method according to claim 9 wherein the first magnetic layer is also formed to function as the second shield layer.

* * * * *

UNITED STATES PATENT AND TRADEMARK OFFICE
CERTIFICATE OF CORRECTION

PATENT NO.     : 6,729,012 B1
DATED          : May 4, 2004
INVENTOR(S)    : Yoshitaka Sasaki It is certified that error appears in the above-identified patent and that said Letters Patent is hereby corrected as shown below:

Column 6,
Kine 6, replace "on,the" with -- on the --.

Column 11,
Line 57, replace "the:" with -- the --.

Signed and Sealed this

Seventeenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,729,012 B1
DATED : May 4, 2004
INVENTOR(S) : Yoshitaka Sasaki

It is certified that error appears in the above-identified patent and that said Letters Patent is hereby corrected as shown below:

Column 6,
Line 6, replace "on,the" with -- on the --.

Column 11,
Line 57, replace "the:" with -- the --.

This certificate supersedes Certificate of Correction issued August 17, 2004.

Signed and Sealed this

Twenty-sixth Day of October, 2004

JON W. DUDAS
*Director of the United States Patent and Trademark Office*